(12) United States Patent
Shepard et al.

(10) Patent No.: US 12,038,540 B2
(45) Date of Patent: *Jul. 16, 2024

(54) WINDOW OCCLUSION IMAGER NEAR FOCAL PLANE

(71) Applicant: Waymo LLC, Mountain View, CA (US)

(72) Inventors: Ralph Shepard, Mountain View, CA (US); Pierre-Yves Droz, Mountain View, CA (US); Matthew Last, Mountain View, CA (US); Bryce Remesch, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,741

(22) Filed: May 8, 2023

(65) Prior Publication Data

US 2023/0273305 A1 Aug. 31, 2023

Related U.S. Application Data

(63) Continuation of application No. 17/405,683, filed on Aug. 18, 2021, now Pat. No. 11,681,031, which is a
(Continued)

(51) Int. Cl.
*G01S 7/497* (2006.01)
*G01S 17/89* (2020.01)

(52) U.S. Cl.
CPC .............. *G01S 7/497* (2013.01); *G01S 17/89* (2013.01); *G01S 2007/4975* (2013.01)

(58) Field of Classification Search
CPC .. G01S 17/89; G01S 17/86; G01S 2007/4975; G01S 2013/9315;
(Continued)

(56) References Cited

U.S. PATENT DOCUMENTS 3,533,704 A 10/1970 Krenmayr
3,540,025 A 11/1970 Levin et al.
(Continued)

FOREIGN PATENT DOCUMENTS

CN 1580691 A 2/2005
CN 106104297 A * 11/2016 ............ G01J 1/0204
(Continued)

OTHER PUBLICATIONS

International Search Report and Written Opinion, application No. PCT/US2020/042729, International filing date Jul. 20, 2020, dated Nov. 4, 2020.

*Primary Examiner* — Michael P Stafira
(74) *Attorney, Agent, or Firm* — McDonnell Boehnen Hulbert & Berghoff LLP

(57) ABSTRACT

The present disclosure relates to optical systems and methods of their operation. An example optical system includes an optical component and one or more light sources configured to emit a light signal. The light signal interacts with the optical component so as to provide an interaction light signal. The optical system also includes a detector configured to detect at least a portion of the interaction light signal as a detected light signal. The optical system additionally includes a controller configured to carry out operations including causing the one or more light sources to emit the light signal and receiving the detected light signal from the detector. The operations also include determining, based on the detected light signal, that one or more defects are associated with the optical component.

20 Claims, 12 Drawing Sheets

Related U.S. Application Data continuation of application No. 16/532,688, filed on Aug. 6, 2019, now Pat. No. 11,137,485.

(58) Field of Classification Search
CPC ..... G01S 2013/9316; G01S 2013/9318; G01S 2013/93185; G01S 2013/9319; G01S 2013/9322; G01S 2013/9329; G01S 13/931; G01S 2013/93273; G01S 17/931; G01S 19/17; G01S 19/41; G01S 19/42; G01S 19/50; G01S 2013/932; G01S 2013/93272; G01S 2013/9321; G01S 2013/93271; G01S 17/42; G01S 17/10; G01S 7/4811; G01S 7/4817; G01S 7/484; G01S 7/4814; G01S 7/4861; G01S 13/865; G01S 13/867; G01S 2205/002; G01S 5/0072; G01S 7/4816; G01S 7/497; G01S 2013/9323; G01S 13/876; G01S 17/894; G01S 17/36; G01S 2013/9325; G01S 7/417; G01S 7/4815; G01S 7/4863; G01S 7/4914; G01S 13/04; G01S 13/751; G01S 15/04; G01S 15/06; G01S 15/42; G01S 15/87; G01S 15/88; G01S 17/04; G01S 17/46; G01S 19/11; G01S 19/14; G01S 19/43; G01S 19/47; G01S 2205/006; G01S 5/16; G01S 5/163; G01S 7/4802; G01S 7/539; G01S 11/12; G01S 7/025; G01S 7/4865; G01S 13/755; G01S 17/18; G01S 17/88; G01S 19/071; G01S 19/49; G01S 19/51; G01S 2013/9317; G01S 2013/9324; G01S 2013/93274; G01S 5/0295; G01S 7/023; G01S 7/0231; G01S 7/0232; G01S 7/0234; G01S 7/0235; G01S 1/7032; G01S 17/93; G01S 19/07; G01S 19/15; G01S 19/393; G01S 19/40; G01S 19/421; G01S 19/428; G01S 19/485

See application file for complete search history.

(56) References Cited

U.S. PATENT DOCUMENTS

| | | | |
|---|---|---|---|
| 4,408,883 A | 10/1983 | Iwamoto et al. | |
| 4,652,745 A | 3/1987 | Zanardelli | |
| 5,355,213 A | 10/1994 | Dotan | |
| 5,414,257 A | 5/1995 | Stanton | |
| 5,483,346 A | 1/1996 | Butzer | |
| 5,627,638 A | 5/1997 | Vokhmin | |
| 5,748,091 A | 5/1998 | Kim | |
| 5,847,822 A | 12/1998 | Sugiura et al. | |
| 5,923,027 A | 7/1999 | Stam et al. | |
| 5,991,049 A | 11/1999 | Tanaka et al. | |
| 6,034,766 A | 3/2000 | Sugiura et al. | |
| 6,066,933 A | 5/2000 | Ponziana | |
| 6,153,995 A | 11/2000 | Tanaka | |
| 6,313,457 B1 | 11/2001 | Bauer et al. | |
| 6,376,824 B1 | 4/2002 | Michenfelder et al. | |
| 6,353,392 B1 | 5/2002 | Schofield et al. | |
| 6,397,161 B1 | 5/2002 | Tanaka et al. | |
| 6,555,804 B1 | 4/2003 | Blasing | |
| 6,687,396 B1 | 2/2004 | Sugiura et al. | |
| 6,697,513 B1 | 2/2004 | Nakayama et al. | |
| 7,034,932 B2 | 4/2006 | Kobayashi et al. | |
| 7,245,367 B2 | 7/2007 | Miller et al. | |
| 7,348,586 B2 | 3/2008 | Ishikawa et al. | |
| 7,465,914 B2 | 12/2008 | Eliasson et al. | |
| 8,144,271 B2 | 3/2012 | Han | |
| 8,553,082 B2 | 10/2013 | Kawasue | |
| 9,098,124 B2 | 8/2015 | Holenarsipur | |
| 9,245,333 B1 | 1/2016 | Beck et al. | |
| 9,319,637 B2 | 4/2016 | Lu et al. | |
| 9,476,968 B2 | 10/2016 | Anderson et al. | |
| 9,874,978 B2 | 1/2018 | Wall | |
| 10,161,886 B2 | 12/2018 | Ohlsson | |
| 10,755,123 B1 | 8/2020 | Mazuir et al. | |
| 2006/0006318 A1 | 1/2006 | Ishikawa et al. | |
| 2006/0171704 A1 | 8/2006 | Bingle et al. | |
| 2007/0165213 A1 | 7/2007 | Fang et al. | |
| 2008/0088702 A1 | 4/2008 | Linsenmaier et al. | |
| 2008/0111989 A1 | 5/2008 | Dufour et al. | |
| 2008/0179507 A2 | 7/2008 | Han | |
| 2009/0278950 A1 | 11/2009 | Deng et al. | |
| 2011/0220779 A1 | 9/2011 | Takaoka | |
| 2011/0253917 A1 | 10/2011 | Rothenhaeusler | |
| 2012/0287424 A1 | 11/2012 | Hori et al. | |
| 2013/0336575 A1 | 12/2013 | Dalla-Torre et al. | |
| 2015/0277111 A1 | 10/2015 | Bell et al. | |
| 2016/0272164 A1 | 9/2016 | Hsiao | |
| 2017/0038459 A1 | 2/2017 | Kubacki | |
| 2017/0109590 A1 | 4/2017 | Gehrke | |
| 2017/0115235 A1 | 4/2017 | Ohlsson et al. | |
| 2017/0135617 A1 | 5/2017 | Alasirniö | |
| 2017/0307736 A1 | 10/2017 | Donovan | |
| 2017/0313288 A1 | 11/2017 | Tippy et al. | |
| 2017/0351261 A1 | 12/2017 | Levinson et al. | |
| 2018/0029563 A1 | 2/2018 | Beloe et al. | |
| 2018/0128740 A1 | 5/2018 | Olschewski et al. | |
| 2018/0188359 A1 | 7/2018 | Droz et al. | |
| 2018/0209912 A1* | 7/2018 | Yang | G01N 33/32 |
| 2018/0211118 A1 | 7/2018 | Diessner et al. | |
| 2018/0266966 A1 | 9/2018 | Olschewski et al. | |
| 2019/0226997 A1 | 7/2019 | Nitikin et al. | |
| 2020/0079325 A1 | 3/2020 | Tilleman et al. | |

FOREIGN PATENT DOCUMENTS

| | | | | |
|---|---|---|---|---|
| CN | 106662636 A | * | 5/2017 | ........... G01B 11/026 |
| CN | 105973805 B | * | 6/2019 | ........ B01L 3/502715 |
| DE | 102016214990 A1 | * | 2/2018 | ........ G01M 11/0221 |
| DE | 102018200626 A1 | | 7/2019 | |
| EP | 1939650 A2 | | 7/2008 | |
| EP | 2977787 A1 | * | 1/2016 | ........... G01M 11/00 |
| EP | 3415951 A1 | | 12/2018 | |
| JP | H05-089530 A | | 4/1993 | |
| JP | 2006-029807 A | | 2/2006 | |
| JP | 2012-150049 A | | 8/2012 | |
| JP | 2016-045161 A | | 4/2016 | |
| JP | 2017-049097 A | | 3/2017 | |
| JP | 2017-090081 A | | 5/2017 | |
| JP | 2018-059772 A | | 4/2018 | |
| WO | 2018154000 A1 | | 8/2018 | |

* cited by examiner

WINDOW OCCLUSION IMAGER NEAR FOCAL PLANE

CROSS-REFERENCE TO RELATED APPLICATIONS

The present application is a continuation of U.S. patent application Ser. No. 17/405,683 filed Aug. 18, 2021; which is a continuation of U.S. patent application Ser. No. 16/532,688 filed Aug. 6, 2019 and issued as U.S. Pat. No. 11,137,485 on Oct. 5, 2021, the contents of each of which are hereby incorporated by reference in their entireties.

BACKGROUND

Light detection and ranging (LIDAR) devices may estimate distances to objects in a given environment by emitting light pulses into the environment and determining a respective time of flight for each light pulse. The time of flight of each light pulse can be used to estimate distances to reflective objects in the environment and/or to create a three-dimensional point cloud indicative of reflective objects in the environment. However, optical aberrations and/or defects along the optical path of the light pulses can lead to erroneous point cloud and/or distance information.

SUMMARY

Example embodiments relate to methods and systems for detecting occlusions (e.g., the presence of debris) on or defects (e.g., cracks, impurities, scratches, voids, air bubbles, etc.) within an optical component of a LIDAR device or another type of optical system (e.g., a camera).

In a first aspect, an optical system is provided. The optical system includes an optical component and one or more light sources configured to emit a light signal. The light signal interacts with the optical component so as to provide an interaction light signal. The optical system also includes a detector configured to detect at least a portion of the interaction light signal as a detected light signal. The optical system additionally includes a controller having at least one processor and at least one memory. The at least one processor executes instructions stored in the at least one memory so as to carry out operations. The operations include causing the one or more light sources to emit the light signal and receiving the detected light signal from the detector. The operations additionally include determining, based on the detected light signal, that one or more defects are associated with the optical component.

In a second aspect, a method is provided. The method includes causing one or more light sources to emit a light signal. The light signal interacts with an optical component of an optical system so as to provide an interaction light signal. The method also includes detecting, by a detector arranged within a housing of the optical system, at least a portion of the interaction light signal as a detected light signal. The method additionally includes determining, based on the detected light signal, that one or more defects are associated with the optical component.

Other aspects, embodiments, and implementations will become apparent to those of ordinary skill in the art by reading the following detailed description, with reference where appropriate to the accompanying drawings.

DETAILED DESCRIPTION

Figure 1:
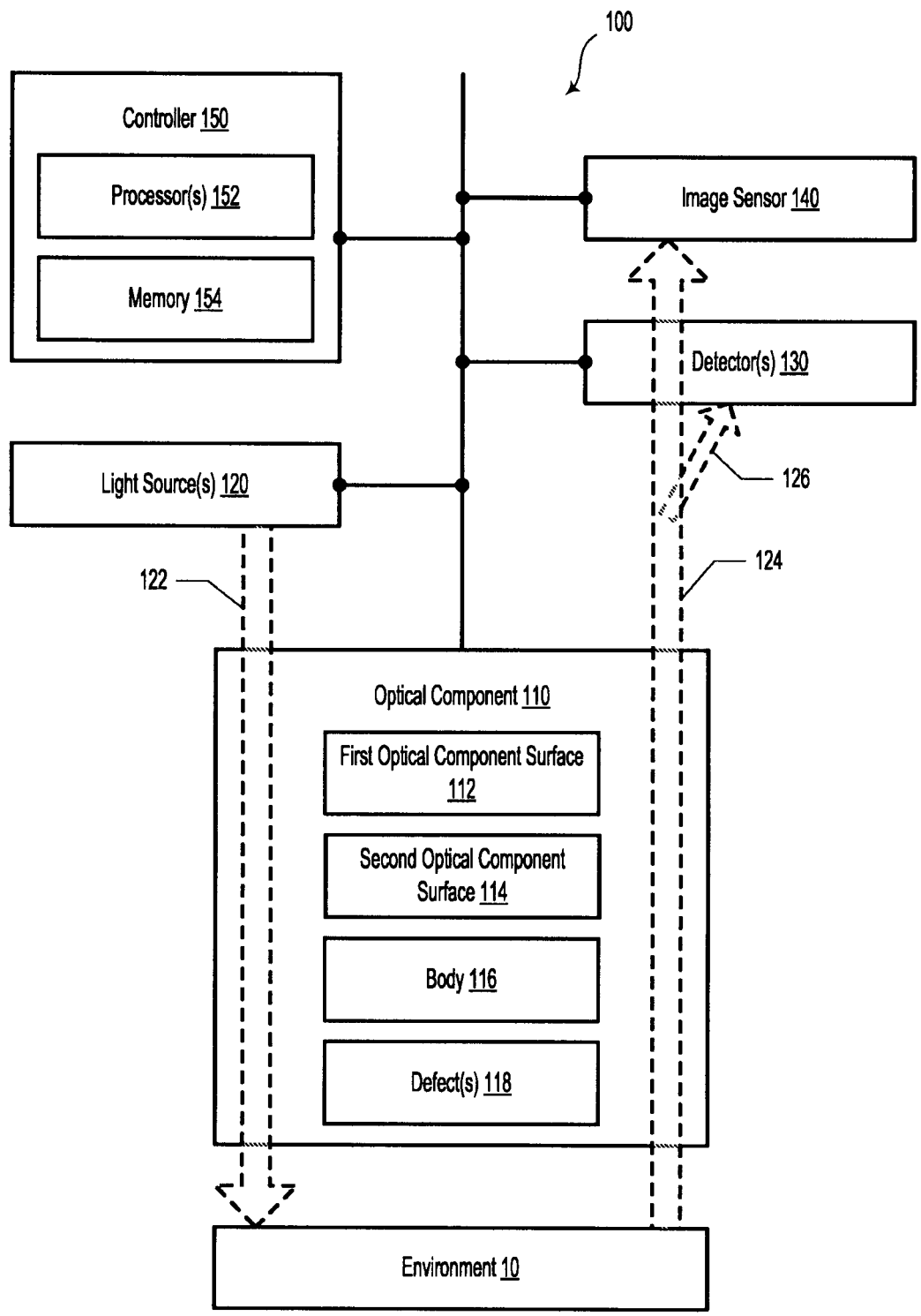
FIG. 1 illustrates an optical system interacting with an environment, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Cameras and image sensors are devices used to capture images of a scene. Some cameras (e.g., film cameras) chemically capture an image on film. Other cameras (e.g., digital cameras) electrically capture image data (e.g., using a charge-coupled device (CCD) or complementary metal-oxide-semiconductor (CMOS) sensors). Images captured by cameras can be analyzed to determine their contents. For example, a processor may execute a machine-learning algorithm in order to identify objects in a scene based on a library of previously classified objects that includes objects' shapes, colors, sizes, etc. (e.g., such a machine-learning algorithm can be applied in computer vision in robotics or other applications).

Cameras can have a variety of features that can distinguish one camera from another. For example, cameras and/or images captured by cameras may be identified by values such as aperture size, f-number, exposure time, shutter speed, depth of field, focal length, International Organization for Standardization (ISO) sensitivity (or gain), pixel size, sensor resolution, exposure distance, etc. These features may be based on the lens, the image sensor, and/or additional facets of the camera. Further, these features may also be adjustable within a single camera (e.g., the aperture of a lens on a camera can be adjusted between photographs).

Light detection and ranging (LIDAR) devices may estimate or be used to estimate distances to objects in a given environment. For example, an emitter subsystem of a LIDAR system may emit near-infrared light pulses, which may interact with objects in the LIDAR system's environment. At least a portion of the light pulses may be redirected back toward the LIDAR (e.g., due to reflection or scattering) and detected by a receiver subsystem. Conventional receiver subsystems may include a plurality of detectors and a corresponding controller configured to determine an arrival time of the respective light pulses with high temporal resolution (e.g., ~400 ps). The distance between the LIDAR system and a given object may be determined based on a time of flight of the corresponding light pulses that interact with the given object. Further, data from LIDAR devices may be used to generate a point cloud (e.g., a three-dimensional point cloud) based on pulses detected by a light detector.

In some cases, imperfections of optical components within a camera or a LIDAR device may cause aberrations within the corresponding captured images or generated point clouds. For example, a scratch, a crack, a smudge, a deformation, debris, a void, an air bubble, an impurity, a degradation, a discoloration, imperfect transparency, a warp, or condensation, etc. may cause light from a scene to be directed to unintended/improper regions of an image sensor/light detector, may prevent light from a scene from ever reaching an image sensor/light detector, or may otherwise modify light from a scene (e.g., modify polarization or wavelength) prior to the light reaching an image sensor/light detector. Such aberrations can result in improper object identification, distance determination, or other errors. Such errors can, in turn, affect the operation of an autonomous vehicle that receives data from the camera or LIDAR device.

Example embodiments relate to methods and systems for detecting occlusions (e.g., the presence of debris) on or defects (e.g., cracks, impurities, scratches, voids, air bubbles, etc.) within an optical component of a LIDAR device or a camera. For example, example methods and systems could relate to detecting contamination (e.g., dirt, water, ice, etc.) on an external window of a LIDAR device.

The detection techniques disclosed herein may include emitting a light signal from a light source to illuminate the optical component on which a diagnostic test is being performed. In some embodiments, the light source could illuminate one or more surfaces of the optical component. As an example, the illuminated surfaces of the optical component could be imaged by one or more cameras located at or near the focal plane of the optical system. In some embodiments, the camera could be incorporated into a main image sensor of the optical system. In other embodiments, the camera could be mounted elsewhere within a housing of the optical system so as to image the optical component to inspect it for occluding features (e.g., dirt, water, ice, etc.) or other types of aberration-causing elements (e.g., cracks, scratches, etc.). Based on images captured by the camera, defects or occlusions could be identified.

In such scenarios, the camera could include a localized or distributed group of pixels located on the main image sensor of the LIDAR or camera system. Furthermore, the pixels on the main image sensors utilized for aberration detection could be optically coupled to lenses and/or other optical elements so that an image of the optical component can be reconstructed upon image capture. For example, the lenses could include one or more microlenses that are coupled to the aberration-sensing portions of the main image sensor.

In other embodiments, the light emitted from the light source may be coupled into the optical component at one end of the optical component (e.g., along an edge of an optical window). Thereafter, the light may propagate throughout the body of the optical component via total internal reflection (TIR). If no occlusions are present on or defects are present within the optical component, the light signal may propagate to an opposite end of the optical component (e.g., where it is absorbed by an absorptive baffle, coupled out of the optical component into free space, or detected by a light detector). If, however, occlusions are present on or defects are present within the optical component, the light signal may be redirected (e.g., to a light detector of the camera system/LIDAR device or to a separate light detector used to detect occlusions/defects) and/or absorbed, at least in part. Based on the detection of light signal (e.g., based on the intensity of the light signal and/or the presence of the light signal), the presence of a defect/occlusion may be identified (e.g., by a computing device executing instructions stored on a non-transitory, computer-readable medium).

In some embodiments, the type of defect/debris present within/on the optical component (e.g., a crack in the optical component vs. mud on the optical component) may also be determined based on the intensity and/or presence of the light signal. For example, the light source may include one or more light-emitting diodes (LEDs) or lasers. The LEDs or lasers may be positioned (e.g., in an array) adjacent to the optical component and/or embedded within the optical component, in various embodiments. Further, optical qualities (e.g., wavelength and/or polarization) of the light signal emitted by the light source may be predetermined to correspond with various types of debris that could potentially occlude the optical component (e.g., mud, leaves, insects, rain, snow, etc.). For example, a wavelength that is known to reflect from a leaf or generate fluorescence in an organic fluorescent compound may be produced by the light source. Additionally or alternatively, optical qualities (e.g., wavelength and/or polarization) of the light signal emitted by the light source may be predetermined to correspond with various types of defects that could potentially by present within the optical component (e.g., cracks, deformations, air bubbles, etc.).

In order to achieve total internal reflection, the light signal may be coupled into the optical component at such an angle so as to achieve total internal reflection based on the indices of refraction of the optical component and the surrounding medium (e.g., the light signal may be coupled into the optical component at a relative high angle of incidence). In some embodiments, the optical component may be an external or internal lens of the camera system or the LIDAR system. Alternatively, the optical component may be an external optical window (e.g., dome) placed between the optics of the camera/LIDAR system and the external environment. In embodiments where an external optical window is used, the external optical window may be designed so as to enhance the total internal reflection of the light signal. For example, the external optical window may be relatively thin so that the reflection angles of the light signal are relatively shallow with respect to the curvature of the external optical window (e.g., thereby ensuring the total internal reflection condition is satisfied). Such an external optical window may be shaped hemispherically or may be shaped as a half-cylinder, in various embodiments.

The diagnostic test may be performed at repeated intervals to ensure the proper functionality of LIDAR devices/cameras. For example, a diagnostic test may be performed every day, hour, minute, thirty seconds, five seconds, second, 500 ms, 100 ms, 50 ms, 10 ms, 5 ms, 1 ms, etc. to determine whether a defect is present on or in the corresponding optical component. Upon detecting a defect associated with the corresponding optical component, corrective action may be taken. For example, the optical component could be cleaned (e.g., using a windshield wiper), repaired (e.g., by a maintenance technician), replaced (e.g., with a new optical component), realigned, etc. In addition, the corrective action taken may correspond to the type of defect detected. For example, if an occlusion on the optical component is detected, a windshield wiper may be engaged, whereas if a crack in the optical component is detected, a replacement optical component may be ordered and/or installed.

Still further, in some embodiments, an escalation protocol could also be employed. For example, if a defect is detected, a cleaning routine of the optical component may be employed. After the cleaning routine is employed, another diagnostic test may be performed. If the same defect is still present on/in the optical component, a realignment/recalibration routine may be employed. If, after performing an additional diagnostic test, the defect is still present on/in the optical component, a replacement optical component may be installed. If, after performing yet another diagnostic test, the defect is still present on/in the optical component, the LIDAR system/the camera may be decommissioned. If, during any of the intermediate diagnostic tests, it is instead detected that the defect has been corrected, the escalation protocol may be reset and additional detection events may not be performed.

II. Example Optical Systems

FIG. 1 illustrates an optical system 100, according to an example embodiment. The optical system 100 includes an optical component 110 and one or more light sources 120. In various embodiments, the optical component 110 could include a lens. In such scenarios, the optical component 110 could include one or more plano-convex lenses, a prism lens, a cylindrical lens, a conical lens, and/or other type of lens. However, other types of optical components, such as filters, films, mirrors, windows, diffusers, gratings, and/or prisms are contemplated and possible.

In example embodiments, the one or more light sources 120 could include a light-emitting diode (LED), a laser, an array of LEDs, or an array of lasers. It will be understood that other light-emitting devices are contemplated and possible within the context of the present disclosure. In such scenarios, the light sources 120 could be configured to emit a light signal 122. The light signal 122 interacts with the optical component 110 so as to provide an interaction light signal 124.

The optical system 100 also includes a detector 130. The detector 130 could be a light-sensitive device that is configured to detect at least a portion of the interaction light signal 124 as a detected light signal 126. In some scenarios, the detector 130 could include at least one of: a charge-coupled device (CCD), a portion of a CCD, an image sensor of a camera, or a portion of an image sensor of a camera. Additionally or alternatively, the detector 130 could include a silicon photomultiplier (SiPM), an avalanche photodiode (APD), a single photon avalanche detector (SPAD), a cryogenic detector, a photodiode, or a phototransistor. Other photo-sensitive devices or systems are possible and contemplated herein.

In some embodiments, the optical system 100 may include an image sensor 140. For example, the image sensor 140 could include a plurality of charge-coupled device (CCD) elements and/or a plurality of complementary metal-oxide-semiconductor (CMOS) elements. In some embodiments, the optical system 100 could include a plurality of image sensors. In an example embodiment, the image sensor 140 could be configured to detect light in the infrared spectrum (e.g., about 700 nanometers to about 1000 nanometers) and/or within the visible spectrum (e.g., about 400 nanometers to about 700 nanometers). Using the image sensor 140 to sense light in other spectral ranges (e.g., long-wavelength infrared (LWIR) light having wavelengths between 8-12 microns) is possible and contemplated herein.

The image sensor 140 could be configured (e.g., sized or dimensioned) according to an image sensor format. For example, the image sensor 140 could include a full-frame (e.g., 35 millimeter) format sensor. Additionally or alternatively, the image sensor 140 could include "crop sensor" formats, such as APS-C (e.g., 28.4 mm diagonal) or one inch (e.g., 15.86 mm diagonal) formats. Other image sensor formats are contemplated and possible within the scope of the present disclosure.

The optical system 100 additionally includes a controller 150. In some embodiments, the controller 150 could be a read-out integrated circuit (ROIC) that is electrically-coupled to the image sensor 140. The controller 150 includes at least one of a field-programmable gate array (FPGA) or an application-specific integrated circuit (ASIC). Additionally or alternatively, the controller 150 may include one or more processors 152 and a memory 154. The one or more processors 152 may include a general-purpose processor or a special-purpose processor (e.g., digital signal processors, etc.). The one or more processors 152 may be configured to execute computer-readable program instructions that are stored in the memory 154. In some embodiments, the one or more processors 152 may execute the program instructions to provide at least some of the functionality and operations described herein.

The memory 154 may include or take the form of one or more computer-readable storage media that may be read or accessed by the one or more processors 152. The one or more computer-readable storage media can include volatile and/or non-volatile storage components, such as optical, magnetic, organic or other memory or disc storage, which may be integrated in whole or in part with at least one of the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

As noted, the memory 154 may include computer-readable program instructions that relate to operations of optical system 100. The at least one processor 152 executes instructions stored in the at least one memory 154 so as to carry out operations.

The operations include causing the one or more light sources 120 to emit the light signal 122. In some embodiments, the light signal 122 could be emitted through the optical component 110 and towards an environment 10 of the optical system 100.

The operations also include receiving the detected light signal 126 from the detector 130.

The operations also include determining, based on the detected light signal 126, that one or more defects 118 are associated with the optical component 110 (e.g., present in a body 116 of the optical component 110 or on a surface of the optical component 110, including the first optical component surface 112 and/or second optical component surface 114).

Figure 2A:
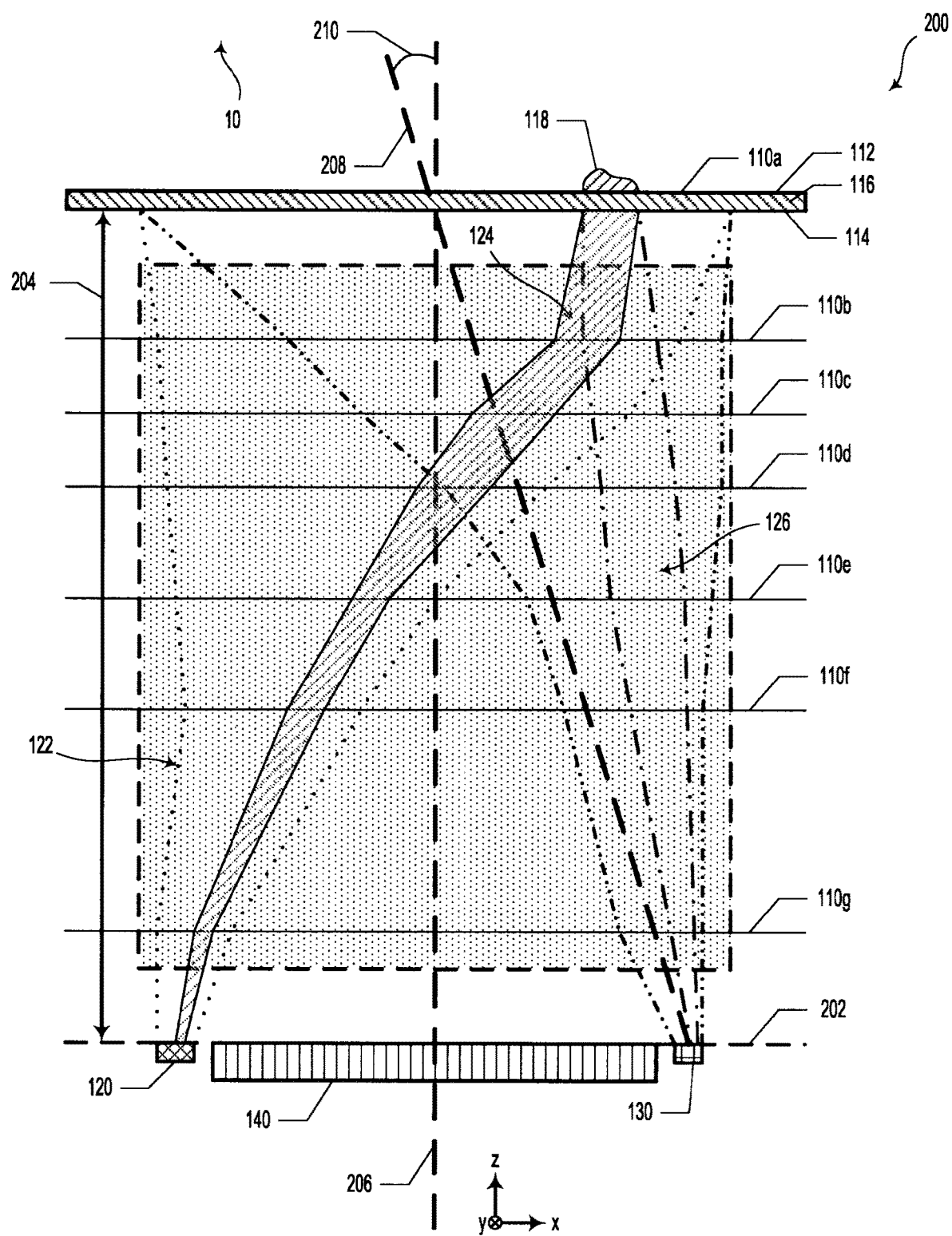
FIG. 2A illustrates an optical system, according to an example embodiment.

FIG. 2A illustrates an optical system 200, according to an example embodiment. Optical system 200 could be similar or identical to optical system 100. Some embodiments could include a small camera and an LED illuminator placed at or adjacent to the focal plane of an image sensor. In such scenarios, the image plane may be sparse enough to provide room for the occlusion detection camera without causing a substantive occlusion in the image.

For example, in some embodiments, the optical system 200 could include an optical axis 206. The optical system 200 could also include a focal distance 204 along the optical axis 206 defining a focal plane 202. In various embodiments, the optical system 200 could include a plurality of optical elements (e.g., lenses) 110b-110g. For example, the optical elements 110b-110g could include lenses of an optical lens assembly.

In some embodiments, the image sensor 140 could be arranged along the focal plane 202. In such scenarios, the detector 130 could also be arranged along the focal plane 202.

As illustrated in FIG. 2A, in some embodiments, the detector 130 could be arranged to detect the detected light signal 126 along a light detection axis, wherein the light detection axis is arranged at a non-zero offset angle 210 (e.g., at least 5 degrees off-axis) with respect to the optical axis 206.

Figure 2B:
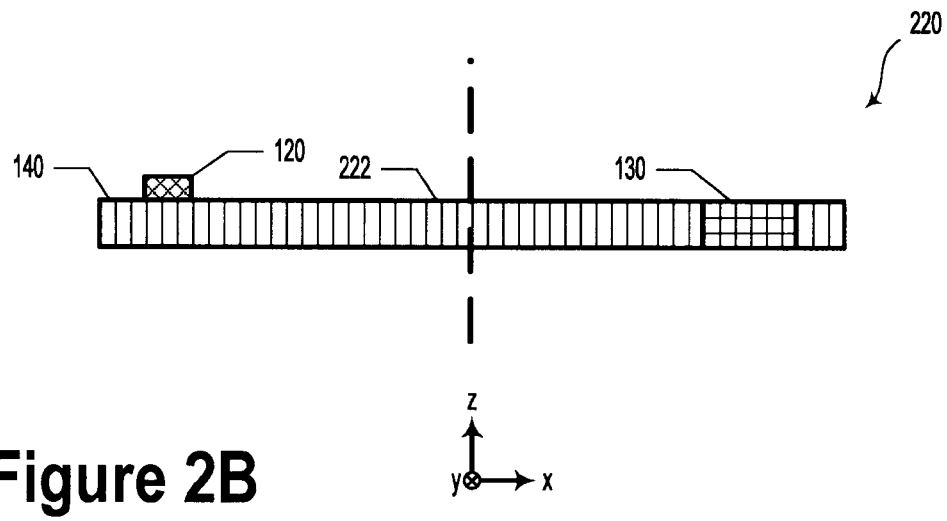
FIG. 2B illustrates a portion of the optical system of FIG. 2A, according to an example embodiment.

FIG. 2B illustrates a portion 220 of the optical system 200 of FIG. 2A, according to an example embodiment. In some embodiments, the image sensor 140 could include a plurality of photodetector elements 222 (e.g., 256 pixels, 1000 pixels, up to 20 megapixels or more). In such scenarios, the detector 130 could include at least a portion of the photodetector elements 222. For example, the detector 130 could include 100×100 pixels of a megapixel-scale image sensor array. It will be understood that the detector 130 could include more or fewer photodetector elements of the overall image sensor 140.

Figure 2C:
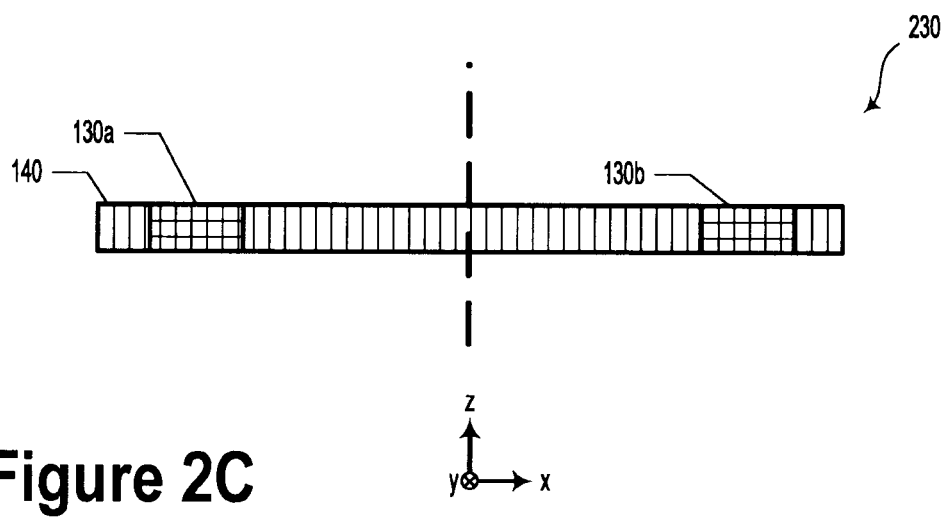
FIG. 2C illustrates a portion of the optical system of FIG. 2A, according to an example embodiment.

FIG. 2C illustrates a portion 230 of the optical system 200 of FIG. 2A, according to an example embodiment. As illustrated in FIG. 2C, the image sensor 140 could include a plurality of detectors (e.g., detector 130a and detector 130b). For example, the plurality of detectors could correspond to a plurality of pixels of the image sensor 140.

Figure 2D:
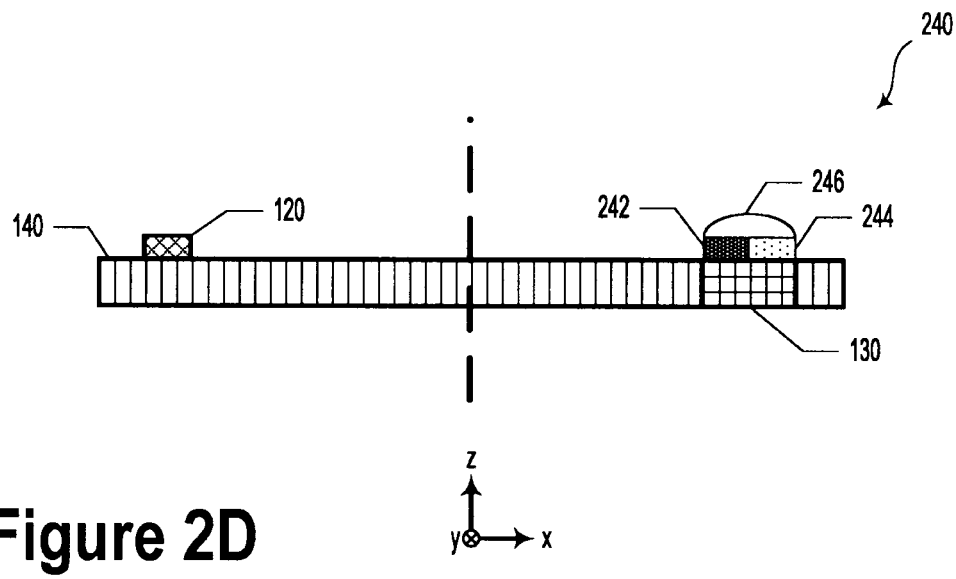
FIG. 2D illustrates a portion of the optical system of FIG. 2A, according to an example embodiment.

FIG. 2D illustrates a portion 240 of the optical system 200 of FIG. 2A, according to an example embodiment. As indicated in FIG. 2D, the detector 130 could include a first optical filter 242 on a first region of the detector and a second optical filter 244 on a second region of the detector 130. In such scenarios, the first optical filter 242 and the second optical filter 244 could be configured to select different ranges of wavelengths (e.g., spectral pass bands).

In some embodiments, the detector 130 could include one or more microlenses 246. The microlens(es) 246 could be optically coupled to the detector 130, the first optical filter 242, and/or the second optical filter 244.

In some embodiments, the wavelength range corresponding to the first optical filter 242 could include a wavelength of the light signal 122. Additionally or alternatively, the wavelength range corresponding to the second optical filter 244 could be configured to exclude the wavelength of the light signal 122. In such scenarios, the operations carried out by the controller 150 could also include comparing a first image portion provided by the first region of the detector 130 to a second image portion provided by the second region of the detector 130. Based on the comparison, a defect type of at least one of the one or more defects (e.g., scratch, bug, dirt, water, snow, crack, etc.) could be determined.

Figure 2E:
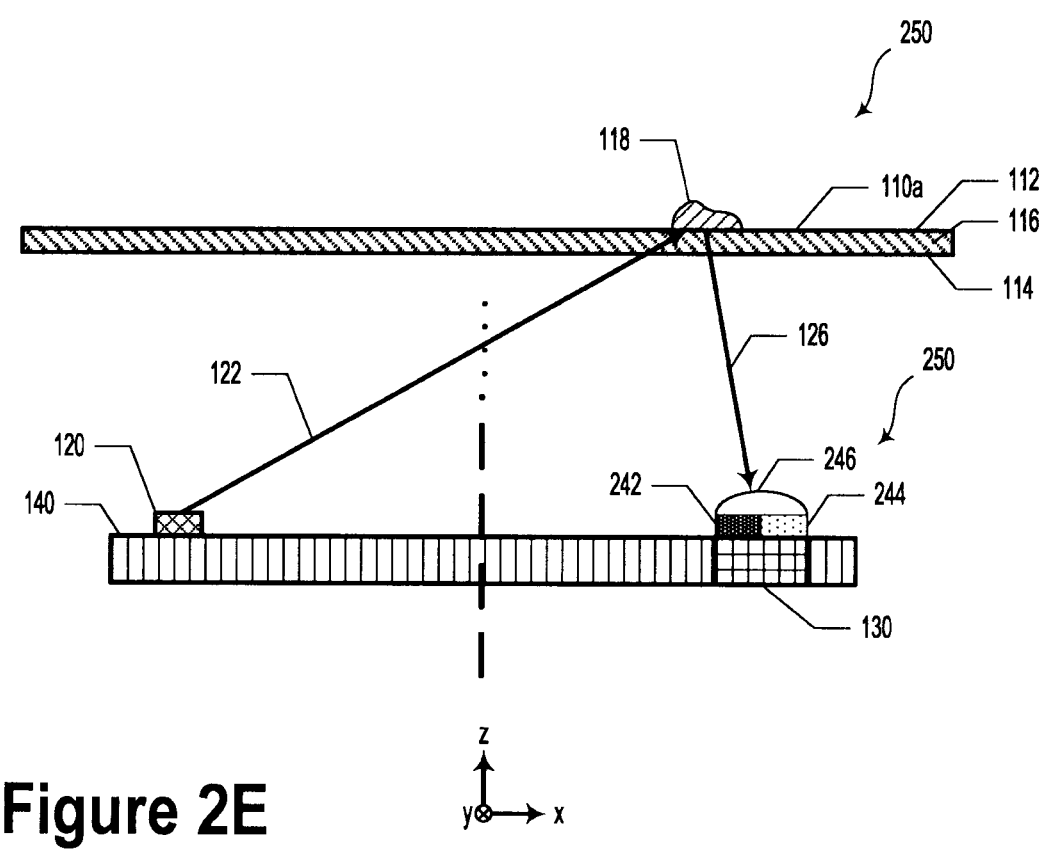
FIG. 2E illustrates a portion of the optical system of FIG. 2A, according to an example embodiment.

FIG. 2E illustrates a portion 250 of the optical system 200 of FIG. 2A, according to an example embodiment. In some embodiments, a wavelength of the light signal 122 could correspond to an excitation wavelength for an organic fluorescent compound (e.g., a fluorophore). In such scenarios, the detector 130 could include an optical filter (e.g., first optical filter 242) that passes an emission wavelength of the organic fluorescent compound and blocks the excitation wavelength of the organic fluorescent compound. In such scenarios, at least a portion of the detected light signal 126 could include the emission wavelength. In some embodiments, the operations could also include determining, based on the detected light signal 126, that one or more organic fluorescent compounds (e.g., defect 118) are present on the surface of the optical component 110a. Such features could provide information on whether the defect 118 could be an insect with the particular organic fluorescent compound (e.g., firefly "splatter").

Figure 3A:
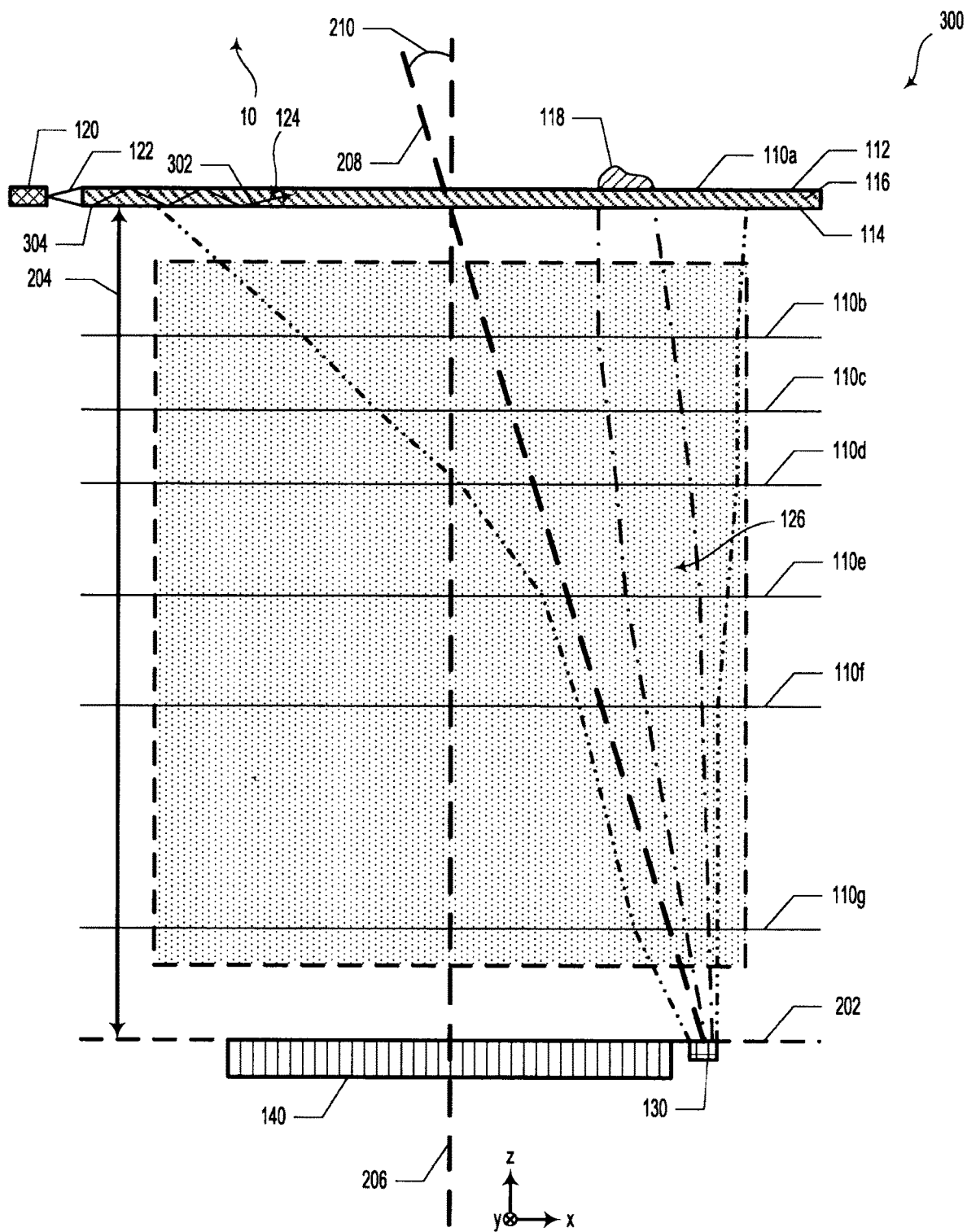
FIG. 3A illustrates an optical system, according to an example embodiment.

FIG. 3A illustrates an optical system 300, according to an example embodiment. Optical system 300 could be similar or identical in various aspects to that of optical system 100 and/or optical system 200, as illustrated and described in reference to FIGS. 1 and 2A-2E. In some embodiments, the light signal 122 could be directed into a body 116 of the optical component 110a so as to be reflected within the body 116 of the optical component 110a via total internal reflection 302. In some embodiments, the light signal 122 could be directed into the body 116 at a desired angle so as to achieve total internal reflection 302.

In example embodiments, the one or more light sources 120 could be positioned adjacent to a first end 304 of the optical component 110a. In such scenarios, the light signal 122 may optically couple into the optical component 110a via the first end 304.

Figure 3B:
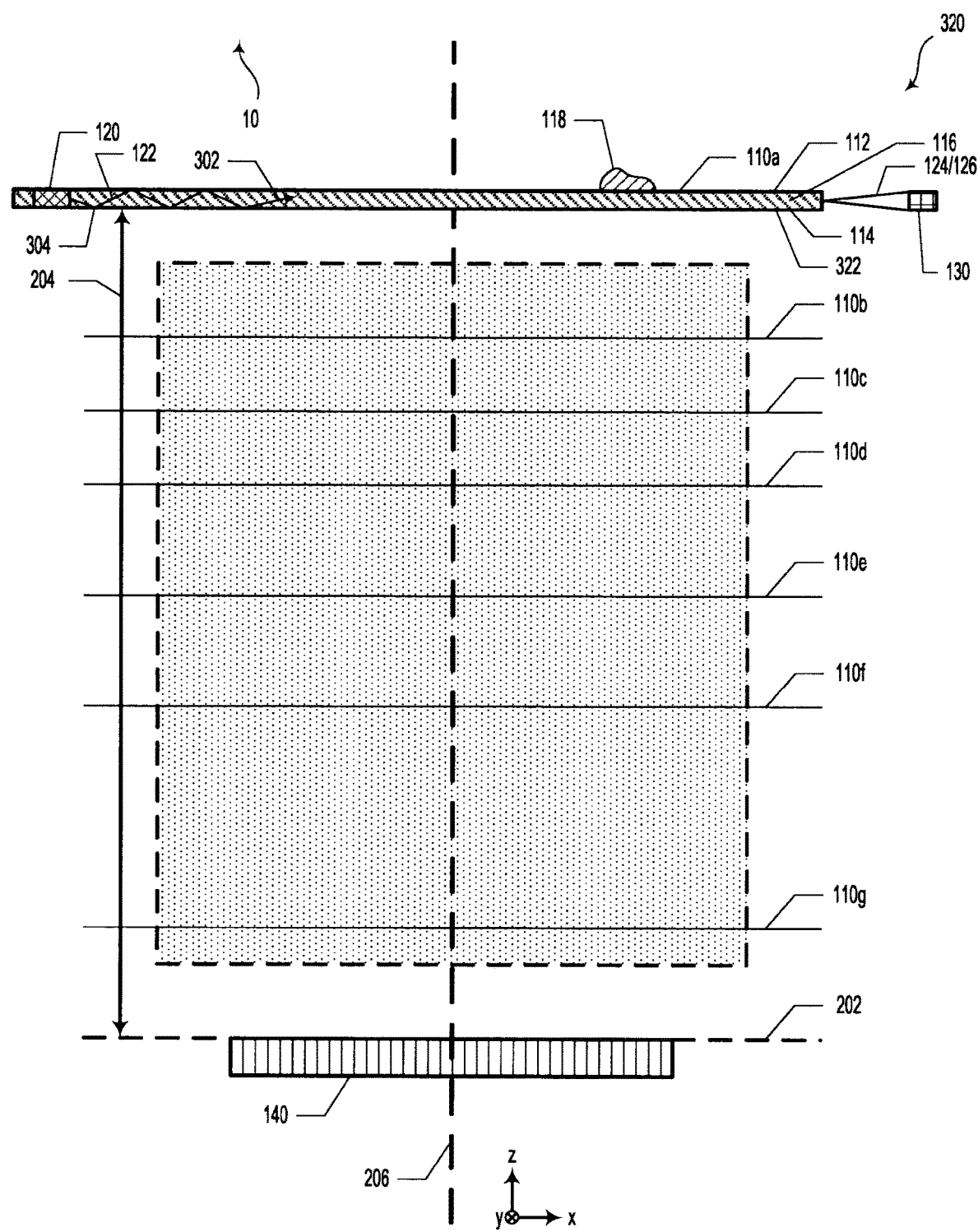
FIG. 3B illustrates a portion of the optical system of FIG. 3A, according to an example embodiment.

FIG. 3B illustrates a portion 320 of the optical system 300 of FIG. 3A, according to an example embodiment. In such a scenario, the detector 130 could be positioned at a second end 322 of the optical component 110a that is opposite the first end 304 of the optical component 110a.

Additionally or alternatively, the optical component 110a could be overmolded over the one or more light sources 120 such that the one or more light sources 120 are at least partially embedded within the optical component 110a. Thus, the one or more light sources 120 could be embedded within or otherwise optically and physically coupled to the optical component 110a.

Figure 3C:
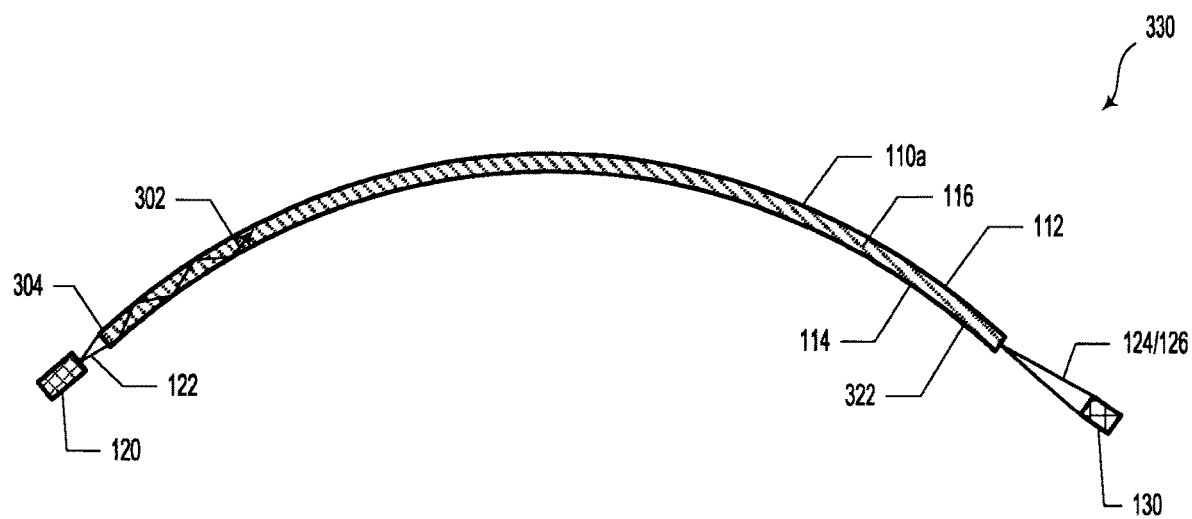
FIG. 3C illustrates a portion of the optical system of FIG. 3A, according to an example embodiment.

FIG. 3C illustrates a portion 330 of the optical system 300 of FIG. 3A, according to an example embodiment. In some examples, the optical component 110a could be an external optical window (e.g., a transparent housing). In such scenarios, the external optical window could be curved (e.g., hemispherically shaped or half-cylindrically shaped). It will be understood that the external optical window could have other shapes or forms.

Figure 4:
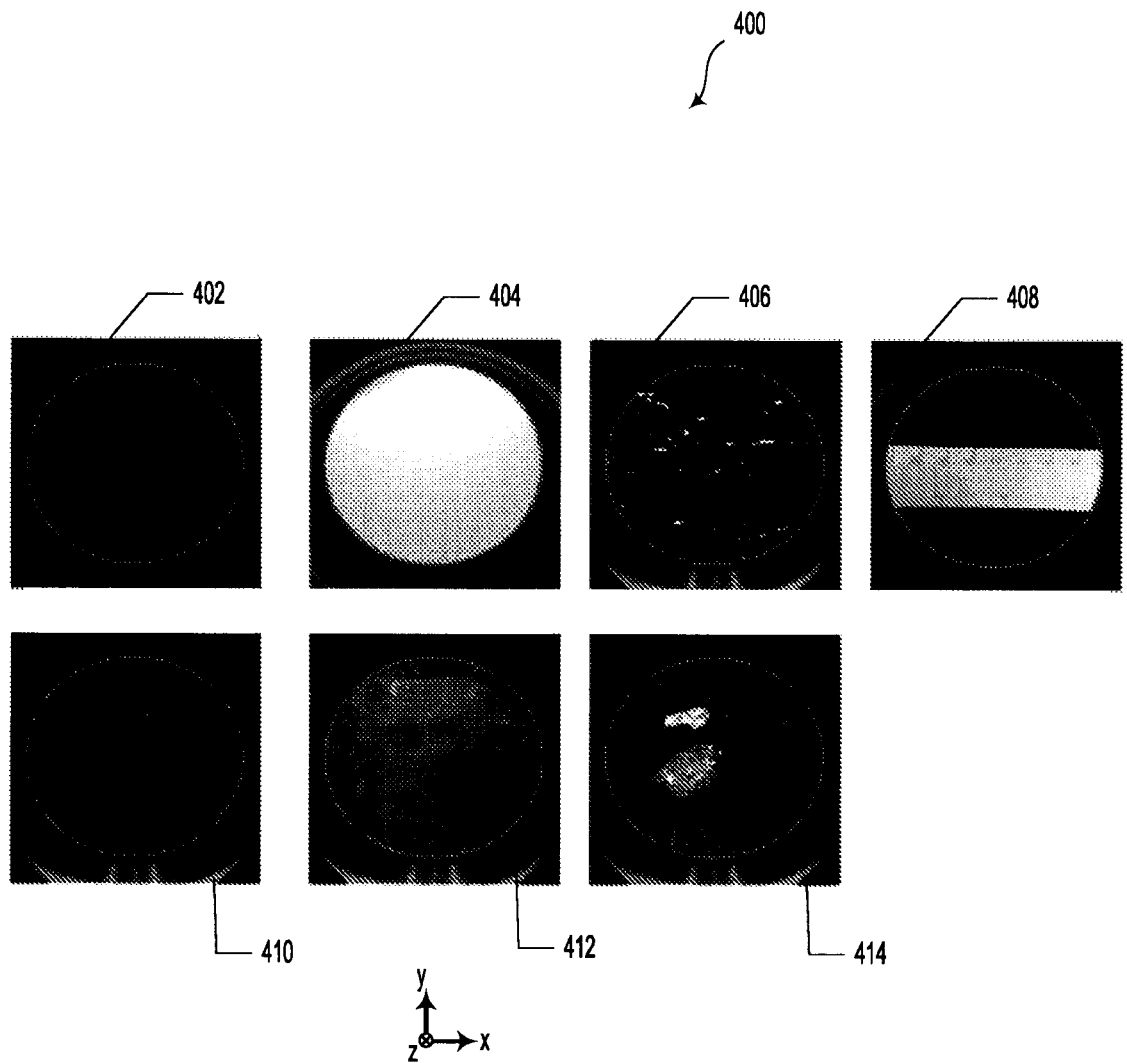
FIG. 4 illustrates images of an optical system, according to example embodiments.
Figure 5A:
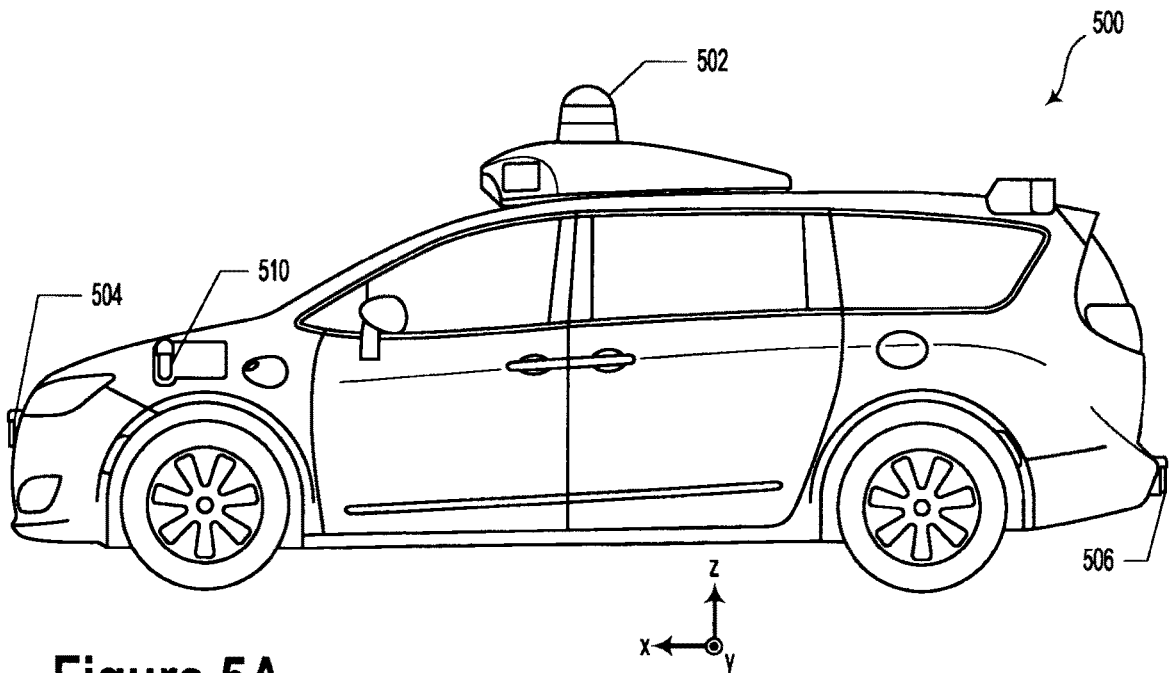
FIG. 5A illustrates a vehicle, according to an example embodiment.
Figure 5B:
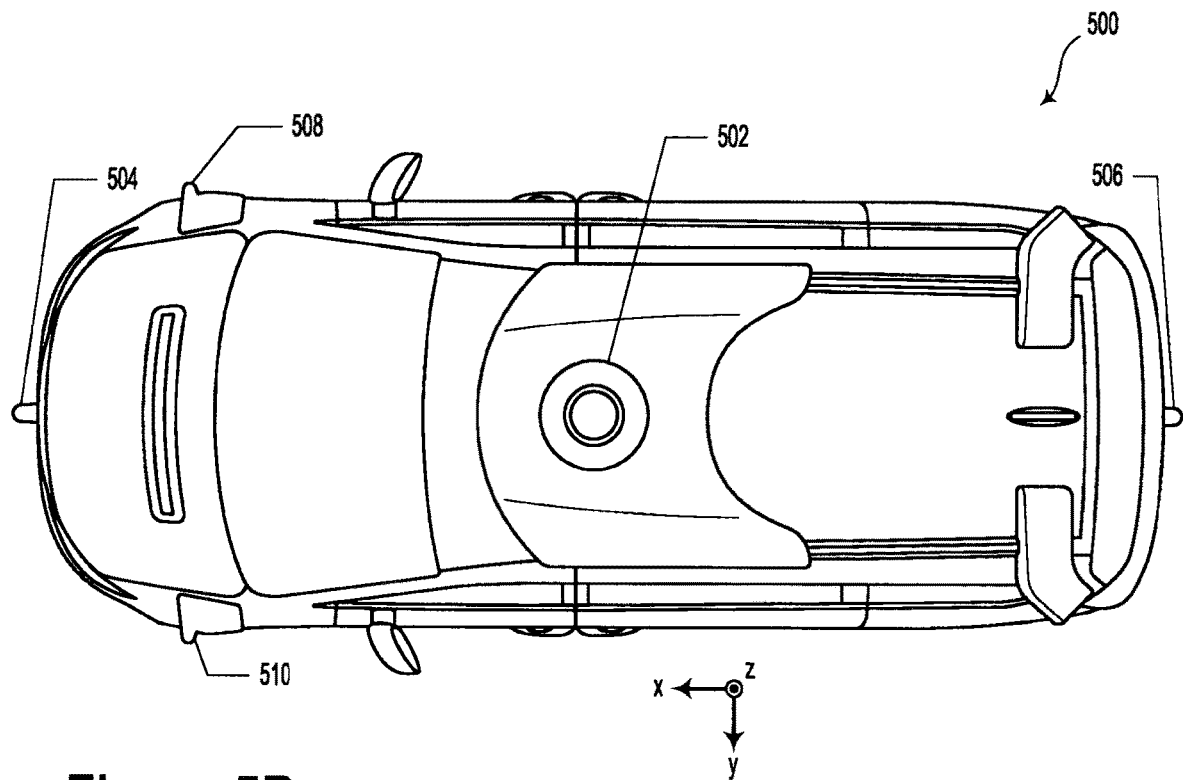
FIG. 5B illustrates a vehicle, according to an example embodiment.
Figure 5C:
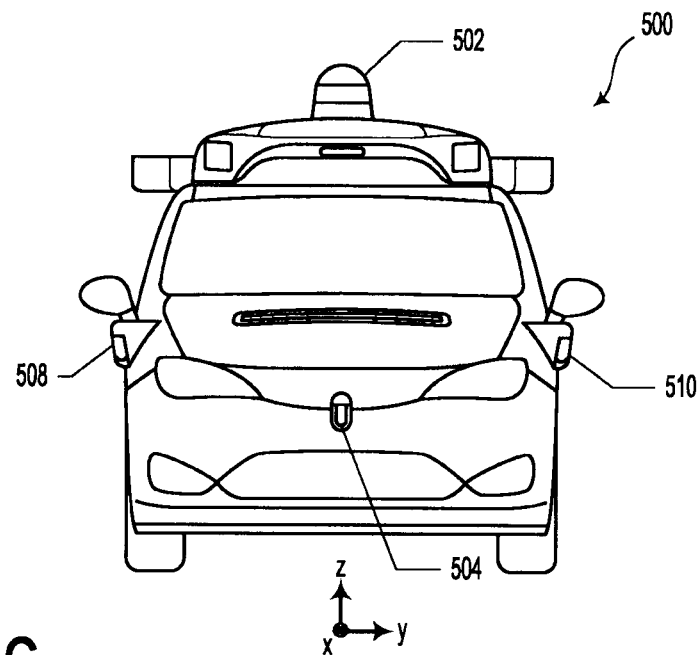
FIG. 5C illustrates a vehicle, according to an example embodiment.
Figure 5D:
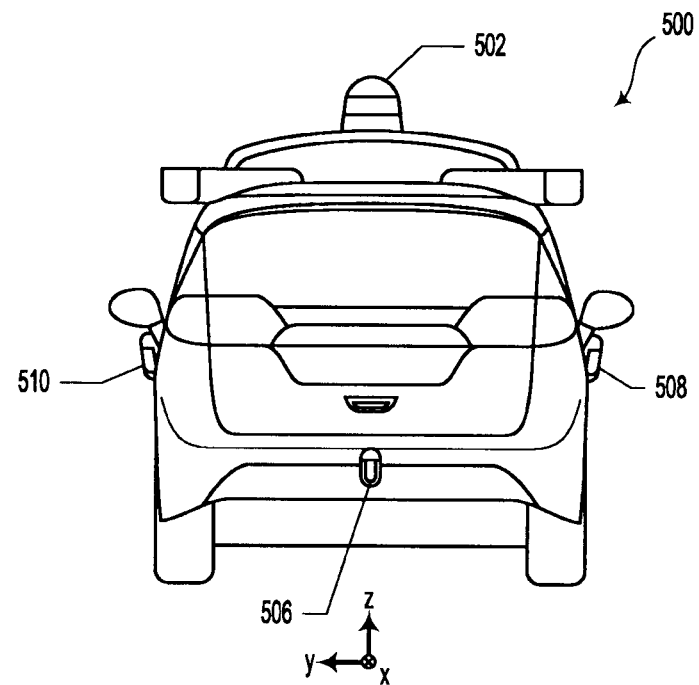
FIG. 5D illustrates a vehicle, according to an example embodiment.
Figure 5E:
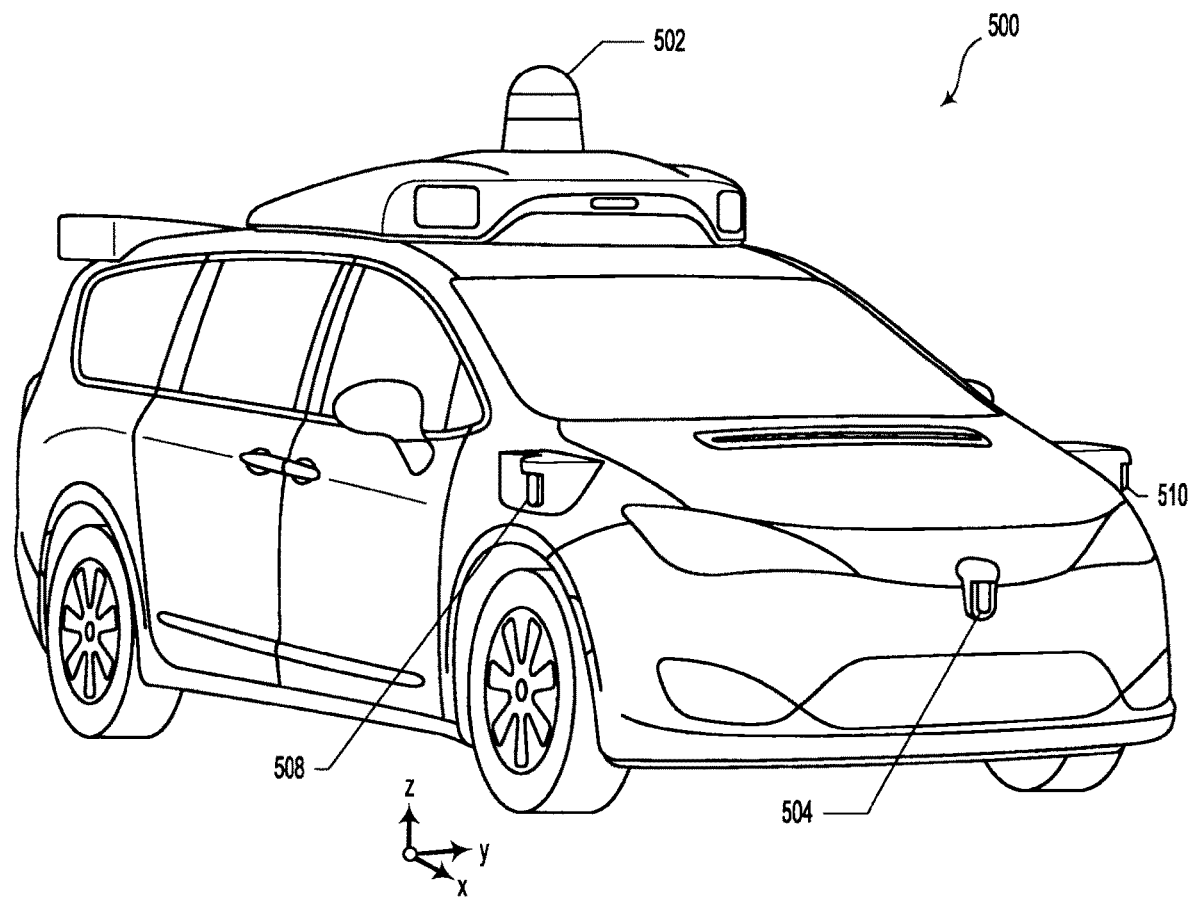
FIG. 5E illustrates a vehicle, according to an example embodiment.

FIG. 4 illustrates various images 400 of an optical component, according to example embodiments. The images 400 could include output from an image sensor (e.g., image sensor 140) and/or a detector (e.g., detector 130). As an example, the images 400 may include images from an inner surface of an optical component 110a. However, other optical components could be imaged, as described elsewhere herein.

In various embodiments, the images 400 could illustrate no window 402, a white diffuser 404, water droplets 406, a ruler 408, a clean window 410, a dirty window 412, and other foreign objects 414. In some embodiments, the various images 400 could undergo image analysis by controller 150 and/or another computing device. In such scenarios, the controller 150 and/or another computing device could, based on the image analysis, determine a type of occlusion (e.g., water droplets, clean/dirty window, etc.).

In some embodiments, one or more sensor units incorporating optical system 100, optical system 200, and/or optical system 300 could be attached or otherwise mounted to a vehicle, as described below.

III. Example Vehicles

FIGS. 5A, 5B, 5C, 5D, and 5E illustrate a vehicle 500, according to an example embodiment. The vehicle 500 could be a semi- or fully-autonomous vehicle. While FIG. 5 illustrates vehicle 500 as being an automobile (e.g., a passenger van), it will be understood that vehicle 500 could include another type of autonomous vehicle, robot, or drone that can navigate within its environment using sensors and other information about its environment.

The vehicle 500 may include one or more sensor systems 502, 504, 506, 508, and 510. In some embodiments, sensor systems 502, 504, 506, 508, and 510 could include optical systems 100, 200, and/or 300 as illustrated and described in relation to FIGS. 1, 2A-2E, and 3A-3C. In other words, the optical systems described elsewhere herein could be coupled to the vehicle 500 and/or could be utilized in conjunction with various operations of the vehicle 500. As an example, optical systems 100, 200, and/or 300 could be implemented in, or in conjunction with, the sensor systems 502, 504, 506, 508, and 510, which could be utilized in self-driving or other types of navigation, planning, and/or mapping operations of the vehicle 500.

While the one or more sensor systems 502, 504, 506, 508, and 510 are illustrated on certain locations on vehicle 500, it will be understood that more or fewer sensor systems could be utilized with vehicle 500. Furthermore, the locations of such sensor systems could be adjusted, modified, or otherwise changed as compared to the locations of the sensor systems illustrated in FIGS. 5A, 5B, 5C, 5D, and 5E.

In some embodiments, the one or more sensor systems 502, 504, 506, 508, and 510 could additionally or alternatively include LIDAR sensors. For example, the LIDAR sensors could include a plurality of light-emitter devices arranged over a range of angles with respect to a given plane (e.g., the x-y plane). For example, one or more of the sensor systems 502, 504, 506, 508, and 510 may be configured to rotate about an axis (e.g., the z-axis) perpendicular to the given plane so as to illuminate an environment around the vehicle 500 with light pulses. Based on detecting various aspects of reflected light pulses (e.g., the elapsed time of flight, polarization, intensity, etc.), information about the environment may be determined.

In an example embodiment, sensor systems 502, 504, 506, 508, and 510 may be configured to provide respective point cloud information that may relate to physical objects within the environment of the vehicle 500. While vehicle 500 and sensor systems 502, 504, 506, 508, and 510 are illustrated as including certain features, it will be understood that other types of sensor systems are contemplated within the scope of the present disclosure.

An example embodiment may include a system having a plurality of light-emitter devices. The system may include a transmit block of a LIDAR device. For example, the system may be, or may be part of, a LIDAR device of a vehicle (e.g., a car, a truck, a motorcycle, a golf cart, an aerial vehicle, a boat, etc.). Each light-emitter device of the plurality of light-emitter devices is configured to emit light pulses along a respective beam elevation angle. The respective beam elevation angles could be based on a reference angle or reference plane, as described elsewhere herein. In some embodiments, the reference plane may be based on an axis of motion of the vehicle 500.

While LIDAR systems with single light-emitter devices are described and illustrated herein, LIDAR systems with multiple light-emitter devices (e.g., a light-emitter device with multiple laser bars on a single laser die) are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment.

In some embodiments, a single light-emitter device may emit light pulses according to a variable shot schedule and/or with variable power per shot, as described herein. That is, emission power and/or timing of each laser pulse or shot may be based on a respective elevation angle of the shot. Furthermore, the variable shot schedule could be based on providing a desired vertical spacing at a given distance from the LIDAR system or from a surface (e.g., a front bumper) of a given vehicle supporting the LIDAR system. As an example, when the light pulses from the light-emitter device are directed downwards, the power-per-shot could be decreased due to a shorter anticipated maximum distance to target. Conversely, light pulses emitted by the light-emitter device at an elevation angle above a reference plane may have a relatively higher power-per-shot so as to provide sufficient signal-to-noise to adequately detect pulses that travel longer distances.

In some embodiments, the power/energy-per-shot could be controlled for each shot in a dynamic fashion. In other embodiments, the power/energy-per-shot could be controlled for successive set of several pulses (e.g., 10 light pulses). That is, the characteristics of the light pulse train could be changed on a per-pulse basis and/or a per-several-pulse basis.

While FIGS. 5A-5E illustrate various LIDAR sensors attached to the vehicle 500, it will be understood that the vehicle 500 could incorporate other types of sensors, such as cameras, ultrasonic sensors, and/or radar sensors.

IV. Example Methods

Figure 6:
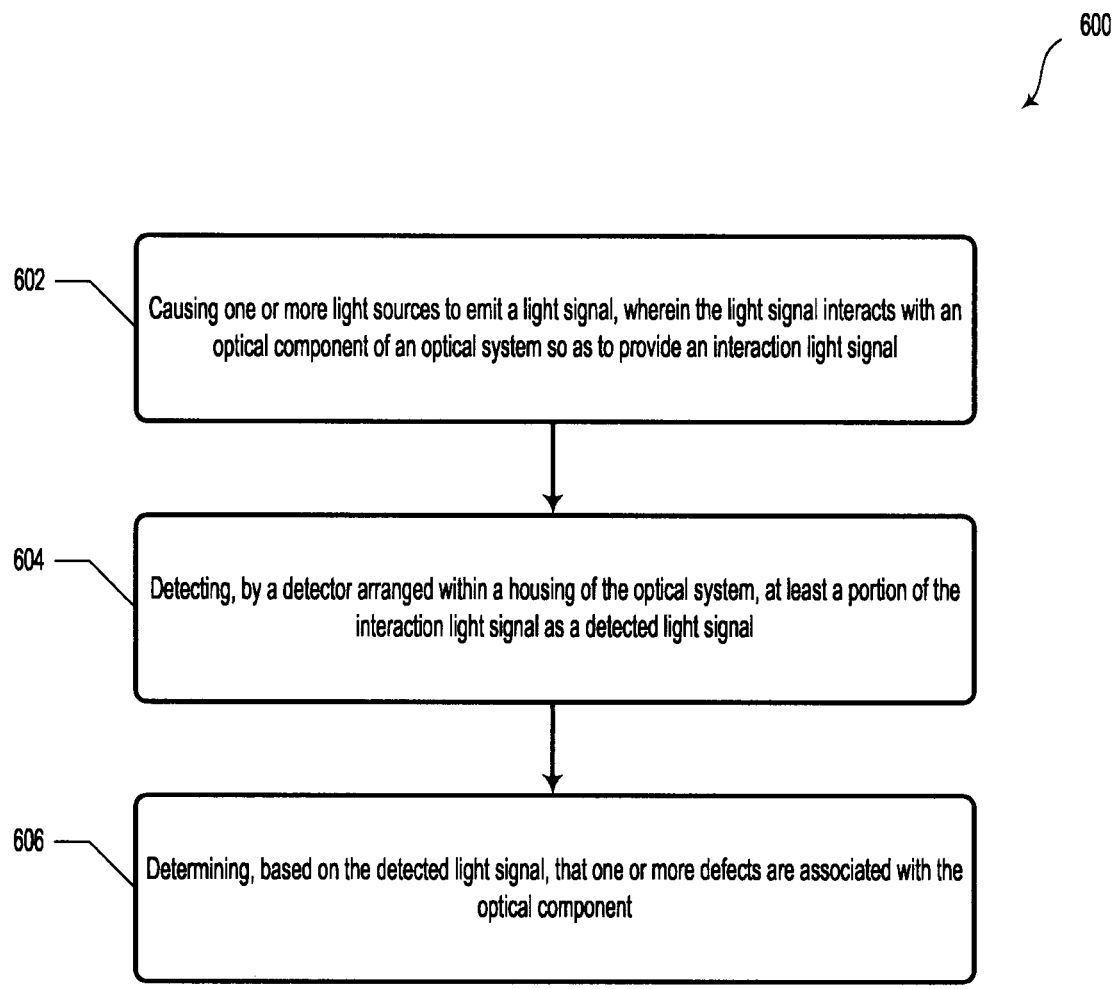
FIG. 6 illustrates a method, according to an example embodiment.

FIG. 6 illustrates a method 600, according to an example embodiment. It will be understood that the method 600 may include fewer or more steps or blocks than those expressly illustrated or otherwise disclosed herein. Furthermore, respective steps or blocks of method 600 may be performed in any order and each step or block may be performed one or more times. In some embodiments, some or all of the blocks or steps of method 600 may relate to elements of the optical systems 100, 200, 300 and/or the vehicle 500 as illustrated and described in relation to FIGS. 1, 2A-2E, 3A-3C, and 5A-5E.

Block 602 includes causing one or more light sources (e.g., light source 120) to emit a light signal (e.g., light signal 122). Causing the light source to emit the light signal could include causing a pulser circuit to transmit a current or voltage pulse to the light source so as to generate one or more light pulses. In some embodiments, the light signal 122 interacts with an optical component (e.g., optical component 110) of an optical system (e.g., optical system 100) so as to provide an interaction light signal (e.g., interaction light signal 124).

Block 604 includes detecting, at a detector (e.g., detector 130) arranged within a housing of the optical system, at least a portion of the interaction light signal as a detected light signal (e.g., detected light signal 126). In example embodiments, receiving the detected light signal could include receiving information indicative of one or more defects on the optical component. In such scenarios, the information could include an image of the optical component and/or information about photon intensity from an environment of the optical system.

Block 606 includes determining, based on the detected light signal, that at least one defect (e.g., defect 118) is associated with the optical component. As an example, the defect could be present in a body (e.g., body 116) of the optical component or on a surface of the optical component (e.g., first optical component surface 112 or second optical component surface 114). In some embodiments, determining at least one defect could include performing an image analysis (e.g., object recognition) on information received from the detector or the image sensor. As an example, the detector or image sensor could provide images such as those illustrated and described with reference to FIG. 4.

In some embodiments, the method 600 could additionally include taking corrective action if it is determined that one or more defects are present in the body of the optical component or on the surface of the optical component.

In various embodiments, taking corrective action could include cleaning, repairing, recalibrating, replacing, realigning, or decommissioning at least one of the detector or the optical component.

In example embodiments, causing the one or more light sources to emit the light signal could include causing the one or more light sources to emit the light signal toward the body of the optical component at such an angle so as to be reflected within the body of the optical component via total internal reflection.

Additionally or alternatively, method 600 could include determining a defect type of at least one defect, wherein the defect type comprises at least one of: a scratch, a crack, a smudge, a deformation, debris, an air bubble, an impurity, a degradation, a discoloration, imperfect transparency, a warp, or condensation (e.g., a water droplet).

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. An optical system comprising:
   an optical component;
   one or more light sources configured to emit a light signal, wherein the light signal interacts with the optical component so as to provide an interaction light signal;
   a defect detector configured to detect at least a portion of the interaction light signal as a detected light signal;
   an optical axis;
   a focal distance along the optical axis defining a focal plane;
   a main image sensor arranged along the focal plane, wherein the defect detector is arranged along the focal plane; and
   a controller comprising at least one processor and at least one memory, wherein the at least one processor executes instructions stored in the at least one memory so as to carry out an escalation protocol comprising:
      performing a diagnostic test at repeated intervals, wherein performing the diagnostic test comprises:
         causing the one or more light sources to emit the light signal; and
         determining, based on a detected light signal from the defect detector, whether one or more defects are associated with the optical component;
      upon determining that one or more defects are associated with the optical component:
         causing a first type of corrective action to be taken; and performing the diagnostic test again to determine whether the one or more defects are still associated with the optical component; and upon determining that the one or more defects are still associated with the optical component, causing a second type of corrective action to be taken.

2. The optical system of claim 1, wherein the repeated intervals are intervals of one day, one hour, one minute, thirty seconds, five seconds, one second, 500 ms, 100 ms, 50 ms, 10 ms, 5 ms, or 1 ms.

3. The optical system of claim 1, wherein the main image sensor comprises a plurality of photodetector elements, and wherein the defect detector comprises at least a portion of the photodetector elements.

4. The optical system of claim 1, wherein the defect detector is arranged to detect the detected light signal along a light detection axis, and wherein the light detection axis is at least 5 degrees off-axis with respect to the optical axis.

5. The optical system of claim 1, wherein the one or more light sources comprise a light-emitting diode (LED) or a laser.

6. The optical system of claim 1, wherein the one or more light sources are positioned adjacent to a first end of the optical component, and wherein the light signal couples into the optical component via the first end.

7. The optical system of claim 6, wherein the defect detector is positioned at a second end of the optical component, wherein the second end is opposite the first end.

8. The optical system of claim 1, wherein the optical component is overmolded over the one or more light sources such that the one or more light sources are at least partially embedded within the optical component.

9. The optical system of claim 1, wherein the first type of corrective action comprises cleaning the optical component.

10. The optical system of claim 9, wherein cleaning the optical component comprises cleaning the optical component using a windshield wiper.

11. The optical system of claim 1, wherein the first type of corrective action comprises repairing the optical component.

12. The optical system of claim 1, wherein the first type of corrective action comprises replacing the optical component.

13. The optical system of claim 1, wherein the first type of corrective action comprises realigning or recalibrating the optical component.

14. The optical system of claim 1, wherein the second type of corrective action comprises cleaning the optical component.

15. The optical system of claim 1, wherein the second type of corrective action comprises repairing the optical component.

16. The optical system of claim 1, wherein the second type of corrective action comprises replacing the optical component.

17. The optical system of claim 1, wherein the second type of corrective action comprises realigning or recalibrating the optical component.

18. The optical system of claim 1, wherein the second type of corrective action comprises decommissioning the optical component.

19. A method comprising:
causing one or more light sources to emit a light signal, wherein the light signal interacts with an optical component of an optical system so as to provide an interaction light signal, and
wherein the optical system comprises:
an optical axis;
a focal distance along the optical axis defining a focal plane; and
a main image sensor arranged along the focal plane; and
performing a diagnostic test at repeated intervals, wherein performing the diagnostic test comprises:
causing the one or more light sources to emit the light signal; and
determining, based on a detected light signal from a defect detector arranged along the focal plane, whether one or more defects are associated with the optical component;
upon determining that one or more defects are associated with the optical component:
causing a first type of corrective action to be taken; and
performing the diagnostic test again to determine whether the one or more defects are still associated with the optical component; and
upon determining that the one or more defects are still associated with the optical component, causing a second type of corrective action to be taken.

20. A vehicle comprising:
at least one optical system, the optical system comprising:
an optical component;
one or more light sources configured to emit a light signal, wherein the light signal interacts with the optical component so as to provide an interaction light signal;
a defect detector configured to detect at least a portion of the interaction light signal as a detected light signal;
an optical axis;
a focal distance along the optical axis defining a focal plane;
a main image sensor arranged along the focal plane, wherein the defect detector is arranged along the focal plane; and
a controller comprising at least one processor and at least one memory, wherein the at least one processor executes instructions stored in the at least one memory so as to carry out an escalation protocol comprising:
performing a diagnostic test at repeated intervals, wherein performing the diagnostic test comprises:
causing the one or more light sources to emit the light signal; and
determining, based on a detected light signal from the defect detector, whether one or more defects are associated with the optical component;
upon determining that one or more defects are associated with the optical component:
causing a first type of corrective action to be taken; and
performing the diagnostic test again to determine whether the one or more defects are still associated with the optical component; and
upon determining that the one or more defects are still associated with the optical component, causing a second type of corrective action to be taken.

* * * * *